United States Patent
Wu

(10) Patent No.: US 10,951,520 B2
(45) Date of Patent: Mar. 16, 2021

(54) SDN, METHOD FOR FORWARDING PACKET BY SDN, AND APPARATUS

(71) Applicant: HUAWEI TECHNOLOGIES CO., LTD, Shenzhen (CN)

(72) Inventor: WenJing Wu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/571,115

(22) Filed: Sep. 14, 2019

(65) Prior Publication Data

US 2020/0028777 A1 Jan. 23, 2020

Related U.S. Application Data

(63) Continuation of application No. PCT/CN2017/076650, filed on Mar. 14, 2017.

(51) Int. Cl.
*H04L 12/715* (2013.01)
*H04L 12/24* (2006.01)
*H04L 12/721* (2013.01)
*H04L 12/741* (2013.01)

(52) U.S. Cl.
CPC .......... *H04L 45/64* (2013.01); *H04L 41/046* (2013.01); *H04L 45/38* (2013.01); *H04L 45/745* (2013.01)

(58) Field of Classification Search
None
See application file for complete search history.

(56) References Cited

U.S. PATENT DOCUMENTS

| | | | |
|---|---|---|---|
| 2015/0180769 A1 | 6/2015 | Wang et al. | |
| 2015/0334085 A1* | 11/2015 | Li | H04L 61/2015 709/245 |
| 2016/0119256 A1* | 4/2016 | Wang | H04L 49/70 370/401 |
| 2016/0119299 A1* | 4/2016 | Amulothu | H04L 63/0485 380/255 |
| 2016/0277280 A1* | 9/2016 | Liu | H04L 45/26 |
| 2017/0026349 A1* | 1/2017 | Smith | H04L 63/0428 |
| 2017/0078210 A1* | 3/2017 | Wang | H04L 47/25 |
| 2017/0257305 A1 | 9/2017 | Jin et al. | |

FOREIGN PATENT DOCUMENTS

| | | | |
|---|---|---|---|
| CN | 104158749 A | 11/2014 | |
| CN | 104735001 A | 6/2015 | |
| CN | 105490960 A | 4/2016 | |
| CN | 105634923 A | 6/2016 | |
| WO | WO-2015077976 A1 * | 6/2015 | ............. H04L 45/26 |

* cited by examiner

*Primary Examiner* — Younes Naji
(74) *Attorney, Agent, or Firm* — Kilpatrick Townsend & Stockton LLP

(57) ABSTRACT

Embodiments of the present invention provide an SDN, a method for forwarding a packet by an SDN, and an apparatus. The SDN includes an SDN controller and an SDN switch, the SDN switch includes a processor and a data path, and the SDN switch further includes: a first transceiver, configured to: receive a first packet, determine that the first packet is to be sent to the SDN controller, and forward the first packet to a channel agent module; and the channel agent module, configured to: add address information of the SDN controller to the first packet, encapsulate the first packet into a second packet, and send the second packet to the controller. The first transceiver is further configured to receive a third packet sent by the SDN controller, and forward the third packet to the channel agent module.

10 Claims, 7 Drawing Sheets

SDN, METHOD FOR FORWARDING
PACKET BY SDN, AND APPARATUS

CROSS-REFERENCE TO RELATED
APPLICATIONS

This application is a continuation of International Application No. PCT/CN2017/076650, filed on Mar. 14, 2017, the disclosure of which is hereby incorporated by reference in its entirety.

TECHNICAL FIELD

The present invention relates to the field of software defined network (SDN) technologies, and in particular, to an SDN, a method for forwarding a packet by an SDN, and an apparatus.

BACKGROUND

As shown in FIG. 1, a software defined network (SDN) is an innovative network architecture. Compared with a conventional network architecture, an SDN network architecture has the following core: An SDN controller (where both a controller and a network controller hereinafter refer to as SDN controllers) is introduced into the network, to implement separation of forwarding from control and implement centralized control. Like the brain of the network, the SDN controller can control all forwarding devices. An SDN switch takes orders from the controller like hands and feet, and all data for forwarding by the SDN switch comes from the SDN controller. A current SDN core technology is implemented based on an OpenFlow protocol. An SDN network based on the OpenFlow protocol is an OpenFlow network, and the OpenFlow network includes an OpenFlow controller (OFC) and an OpenFlow switch (OFS). The OFS includes a processor (for example CPU) and a data path. The processor has a function of an OpenFlow agent. The data path includes several flow tables and one group table. These tables are used to search for and forward a packet. An OpenFlow channel is an interface for communication between the OpenFlow switch and the OpenFlow controller, and the switch communicates with the controller through the interface based on the OpenFlow protocol. The flow table includes a plurality of flow entries. If a to-be-forwarded packet has a corresponding flow entry in the flow table, the packet is forwarded based on the flow table. If a to-be-forwarded packet has no corresponding flow entry in the flow table, the OFS requests an instruction from the OFC; the OFC delivers a flow entry to the OFS after receiving a request from the OFS; and the OFS adds the delivered flow entry to the flow table after obtaining the flow entry, and then forwards the packet based on a new flow table.

As shown in FIG. 2, an OFS and an OFC communicate with each other through an OpenFlow channel of an OFA (OpenFlow Agent). The OFA is deployed on software of a CPU to meet a requirement of establishing an OpenFlow channel with an SDN controller and communicating with the SDN controller. A protocol packet sent by an SDN switch to the SDN controller is referred to as a packet in packet, and a protocol packet sent by the SDN controller to the SDN switch is referred to as a packet out packet. In an architecture in which control and forwarding of an SDN are separated, a protocol packet needs to be sent to the SDN controller, so that the SDN controller processes a protocol packet; and forwarding is performed by a CPU of the SDN switch, causing an extra latency that is usually at a level of 10 ms, and resulting in undesirable latency performance for a performance-sensitive protocol (such as IGMP and ERPS).

SUMMARY

Embodiments of the present invention provide an SDN, a method for forwarding a packet by an SDN, and an apparatus, to reduce a latency of forwarding a packet.

According to a first aspect, an embodiment of the present invention provides a software defined network, where the software defined network includes an SDN controller and an SDN switch, the SDN switch includes a processor and a data path, and the SDN switch further includes:

a first transceiver, configured to: receive a first packet, determine that the first packet is to be sent to the controller, and forward the first packet to a channel agent module; and the channel agent module, configured to: add address information of the SDN controller to the first packet, encapsulate the first packet into a second packet, and send the second packet to the controller, where the first transceiver is further configured to: receive a third packet sent by the SDN controller, and forward the third packet to the channel agent module; and the channel agent module is further configured to: delete control information and address information in the third packet, convert the third packet into a fourth packet, and send the fourth packet to a corresponding port or flow table according to at least one of a port number or a flow table number that is carried in the control information in the third packet.

In a possible design, the second packet and the third packet each are one of a dynamic host configuration protocol DHCP packet, an Internet group management protocol IGMP packet, and an Ethernet ring protection switching ERPS packet.

In a possible design, the first transceiver is further configured to receive the control information and the address information that are delivered by the controller and are required for communication between the channel agent module and the controller, where the control information and the address information include but are not limited to an IP address of the SDN switch, an IP address of the SDN controller, and an OpenFlow version number.

In a possible design, the first transceiver is further configured to receive an encryption/decryption algorithm mode that is delivered by the SDN controller and that is used for data transmission between the controller and the SDN switch.

In a possible design, the channel agent module is further configured to encrypt and decrypt the second packet and the third packet by using the encryption/decryption algorithm mode.

According to a second aspect, a method for forwarding a packet by a software defined network is provided, and includes:

receiving a first packet, determining that the first packet is to be sent to an SDN controller, and forwarding the first packet to a channel agent module;

adding, by the channel agent module, address information of the SDN controller to the first packet, encapsulating the first packet into a second packet, and sending the second packet to the controller; and receiving a third packet sent by the SDN controller, and forwarding the third packet to the channel agent module; and deleting, by the channel agent module, control information and address information in the third packet, converting the third packet into a fourth packet, and sending the fourth packet to a corresponding port or flow table according to at least one of a port number or a flow table number that is carried in the control information in the third packet.

In a possible design, the second packet and the third packet each are one of a dynamic host configuration protocol DHCP packet, an Internet group management protocol IGMP packet, and an Ethernet ring protection switching ERPS packet.

In a possible design, the method further includes: receiving the control information and the address information that are delivered by the controller and are required for communication between the channel agent module and the controller, where the control information and the address information include but are not limited to an IP address of an SDN switch, an IP address of the SDN controller, and an OpenFlow version number.

In a possible design, the method further includes: receiving an encryption/decryption algorithm mode that is delivered by the controller and that is used for data transmission between the SDN controller and the SDN switch.

In a possible design, the method further includes: encrypting and decrypting the second packet and the third packet by using the encryption/decryption algorithm mode.

According to a third aspect, a channel agent module is provided, where the channel agent module is located in an SDN switch of a software defined network, and includes:

a second transceiver, configured to: receive a first packet, send a second packet to a controller, receive a third packet sent by the controller, and send a fourth packet to a corresponding port or flow table according to at least one of a port number or a flow table number that is carried in control information in the third packet; and a processor, configured to: add address information of the SDN controller to the first packet, encapsulate the first packet into the second packet, and send the second packet to the second transceiver; and delete the control information and address information in the third packet, convert the third packet into the fourth packet, and send the fourth packet to the second transceiver.

In a possible design, the channel agent module is one of a network processor NP, a field programmable gate array FPGA, or an application-specific integrated circuit ASIC.

According to the embodiments of the present invention, the channel agent module is disposed on the SDN switch, and a packet that is originally forwarded by a CPU of the SDN switch to the SDN controller is forwarded by the channel agent module, thereby reducing a latency of forwarding a packet by the SDN.

DESCRIPTION OF EMBODIMENTS

To make objectives, technical solutions, and advantages of the present invention clearer and more comprehensible, the following further describes the present invention in detail with reference to specific embodiments and related accompanying drawings.

In the embodiments, an SDN network architecture includes one or more SDN switches and one or more SDN controllers. These SDN switches may communicate with these SDN controllers by using an OpenFlow protocol or another protocol. In the following embodiments, solutions are described in detail mainly based on an OpenFlow network including an OFS and an OFC. Certainly, related solutions based on the OpenFlow network in the embodiments of the present invention are also applicable to an SDN network implemented by using another similar protocol.

Figure 2:
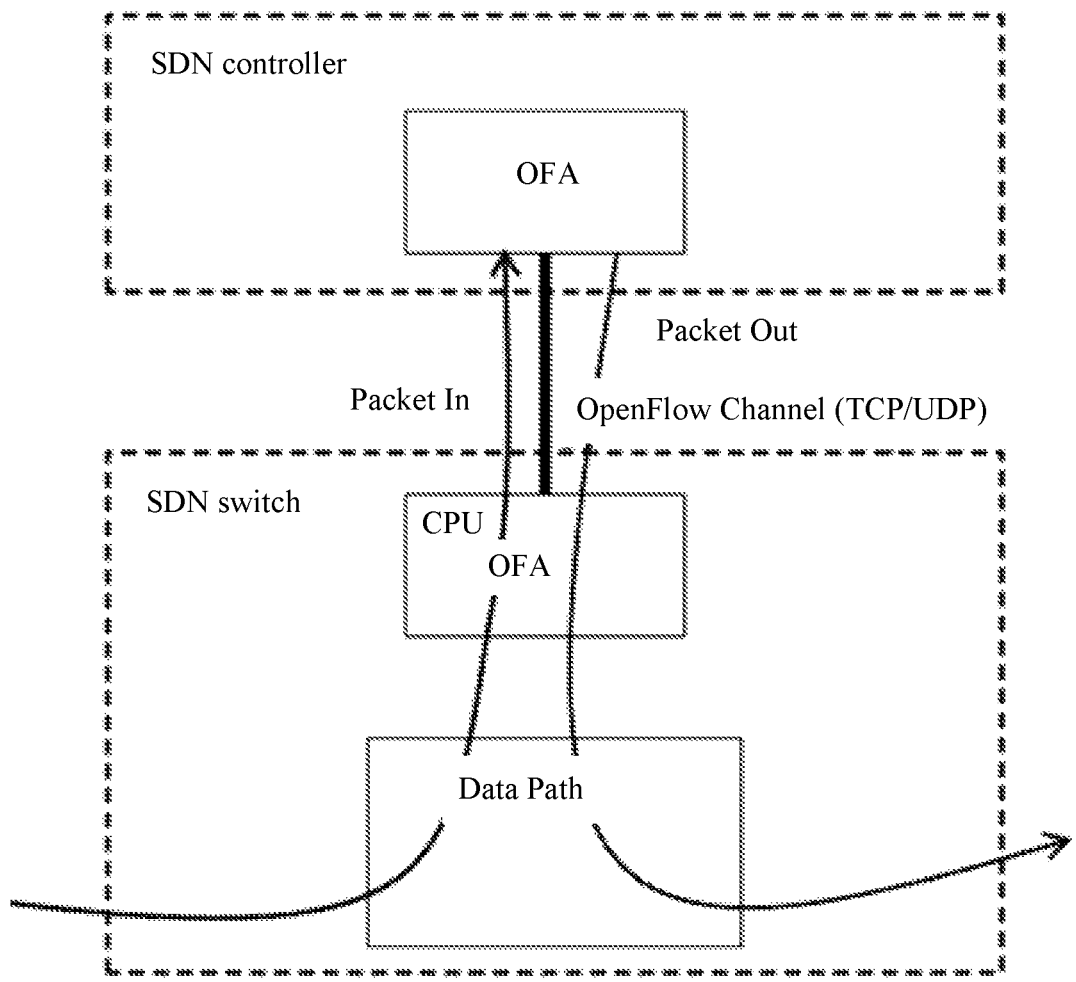
FIG. 2 is a schematic diagram of forwarding a packet by an existing SDN.

An internal principle of an OpenFlow switch first needs to be described. As shown in FIG. 2, by using an OpenFlow protocol, a switch adds, updates, and deletes an entry of a flow table either in a manner of "switch requests→controller responds" or in a manner of "controller actively performs control without being requested by a switch". Each flow table includes individual entries, and each entry includes a packet match field, a counter, and a processing instruction. A packet matching process starts from a flow table with a smallest number. Based on arrangement of a controller, a packet forwarding task may be completed by using one flow table or a plurality of flow tables connected in series. In a same flow table, flow entries are arranged in order, and an entry with a highest priority is placed in the forefront. When a packet matches an entry, an instruction in the entry is executed. If a packet cannot match any entry, based on whether a "table-miss" entry is configured, the switch sends the packet to the controller based on the OpenFlow protocol, discards the packet, or sends the packet to a next-level flow table for processing.

In a flow entry, a packet may be forwarded to a port as required. The port is usually a physical port of a switch, or the port may be a logical port or a reserved port. The logical port is usually a trunk port, a tunnel, or a loopback interface. The reserved port actually represents a forwarding behavior, for example, sending a packet to the controller, flooding a packet to all physical ports, or processing a packet by using a conventional switch method instead of an OpenFlow method. In the following embodiments, in view of both usage of a port for a person skilled in the art and facilitation of explanation, not every port is expressed as a "physical port" or a "logical port", a person skilled in the art can easily know a type of the "port" with reference to a context.

In the following embodiments, a protocol packet sent by the SDN switch to the SDN controller is referred to as a packet in packet, and a protocol packet sent by the SDN controller to the SDN switch is referred to as a packet out packet.

Embodiment 1

Figure 3:
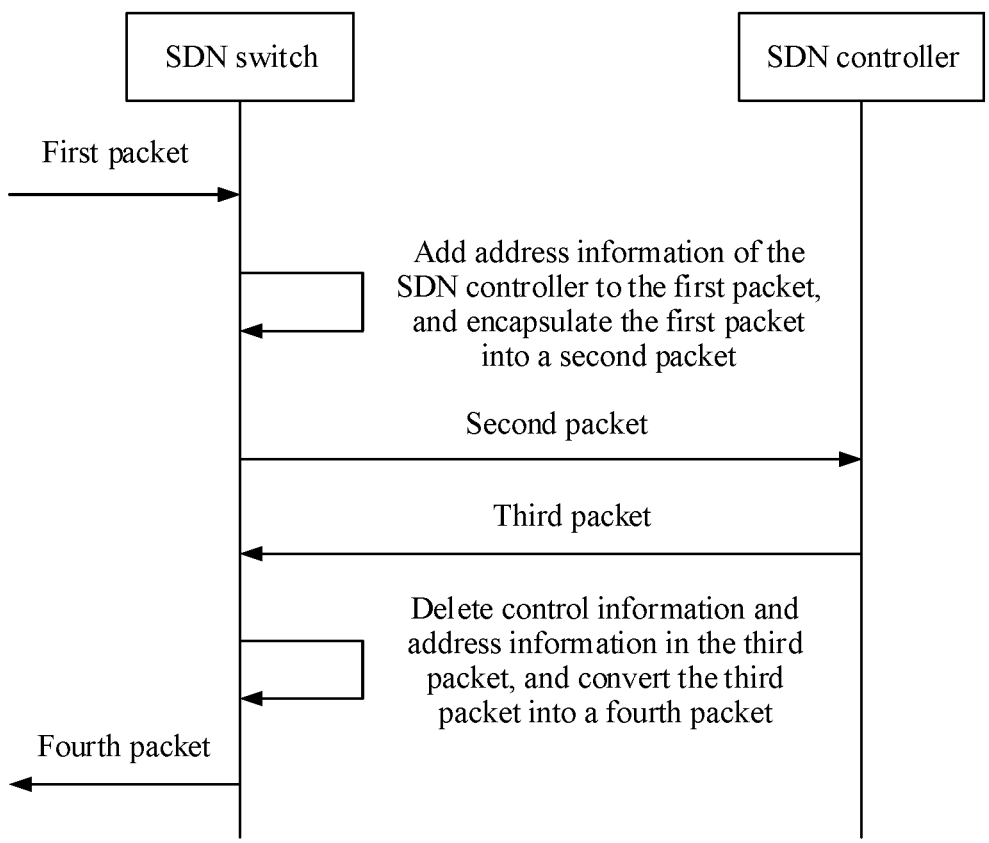
FIG. 3 is a flowchart of a method for forwarding a packet by a software defined network according to an embodiment of the present invention.
Figure 4:
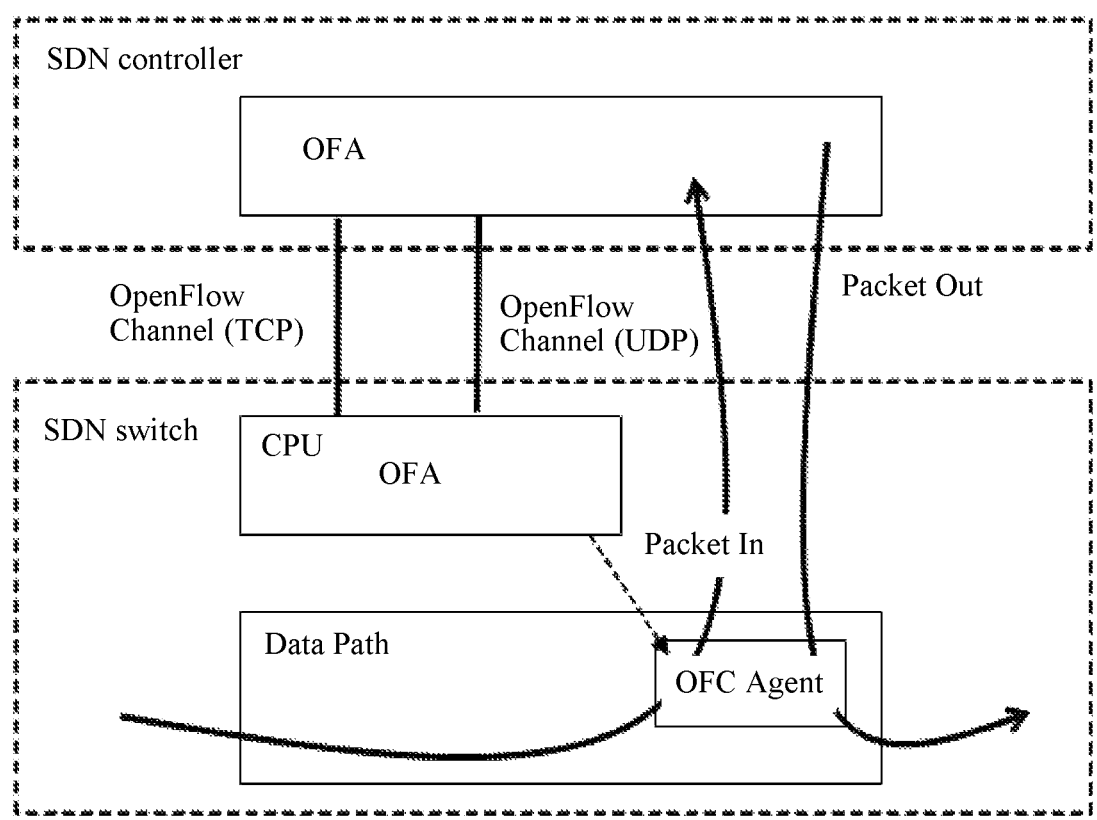
FIG. 4 is a schematic diagram of forwarding a packet between an SDN controller and an SDN switch according to an embodiment of the present invention.

FIG. 3 is a flowchart of a method for forwarding a packet by a software defined network SDN according to an embodiment of the present invention. FIG. 4 is a corresponding scenario diagram, and the method includes the following procedure steps.

As shown in FIG. 4, when an SDN uses an OpenFlow protocol, first, a primary OpenFlow channel needs to be established by an OFA (OpenFlow agent) of a CPU of an SDN switch and an OFA of an SDN controller. Second, a secondary OpenFlow channel needs to be established by the OFA of the CPU of the SDN switch and the OFA of the SDN controller. After the secondary OpenFlow channel is established, parameters required for communication with the SDN controller are sent to a channel agent module of the SDN switch. The parameters include but are not limited to key parameters such as an IP address of the SDN switch, an IP address of the SDN controller, and an OpenFlow version number. If encrypted transmission is performed between the SDN switch and the SDN controller, an encryption/decryption algorithm mode needs to be delivered to the channel agent module. Subsequently, the channel agent module encrypts and decrypts a second packet and a third packet by using the encryption/decryption algorithm mode.

Specifically, the method includes the following steps.

Step 301: The SDN switch receives a first packet, searches a flow table, and if the first packet cannot match any entry, determines that the first packet needs to be sent to the SDN controller, and forwards the first packet to the channel agent module.

Step 302: The channel agent module adds address information of the SDN controller to the first packet, encapsulates the first packet into the second packet, namely, a packet in packet, and sends the second packet to the controller by using the secondary OpenFlow channel.

It should be noted that, in addition to the address information (such as the IP address) of the SDN controller, information such as a destination MAC address, a source MAC address, and VLAN information may be added to the first packet as required, and then the first packet is encapsulated into the second packet, to ensure that the second packet can be successfully sent to the SDN controller.

An OpenFlow header field or the like may be further added to the packet in packet. The OpenFlow header field includes OpenFlow version information, a length, a buffer ID, a traction ID, a flow table number table ID, and the like. If the second packet is implemented by using a user datagram protocol (UDP), the second packet further needs to carry parameter information such as a source UDP port and a destination UDP port.

Figure 5:
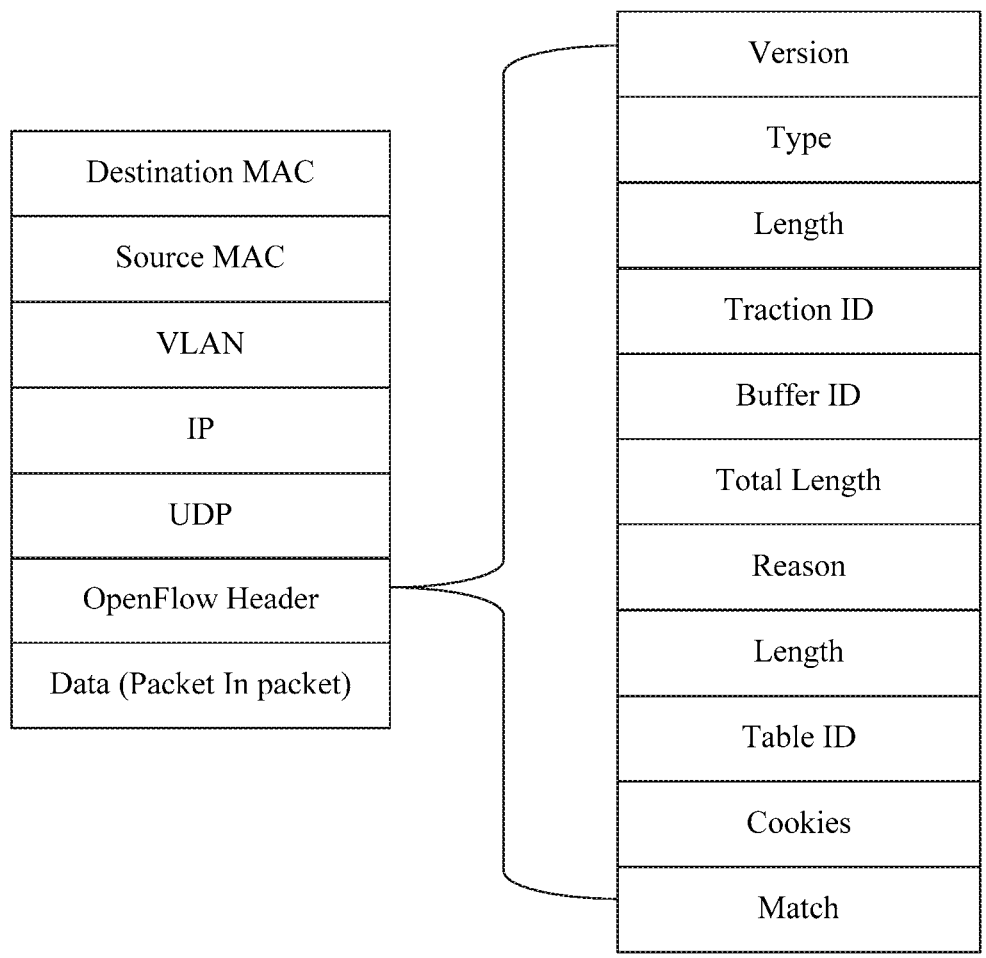
FIG. 5 is a schematic diagram of a frame structure of a packet in packet according to an embodiment of the present invention.

Specifically, a specific frame format of the second packet may be a packet in packet format shown in FIG. 5 and defined in an OpenFlow SDN standard. Because no packet format change is involved in this embodiment of the present invention, for a meaning of the foregoing field, refer to a definition in the standard. Details are not described herein. Refer to the foregoing packet format when the SDN uses another protocol.

Step 303: The SDN switch receives the third packet, namely, a packet out packet, sent by the SDN controller, and forwards the third packet to the channel agent module. The third packet is sent to the SDN switch by using the secondary OpenFlow channel.

Step 304: The channel agent module deletes control information and address information in the third packet to obtain a fourth packet, and forwards the fourth packet to a corresponding port or flow table according to at least one of a port number or a flow table number that is carried in the control information in the third packet.

Figure 6:
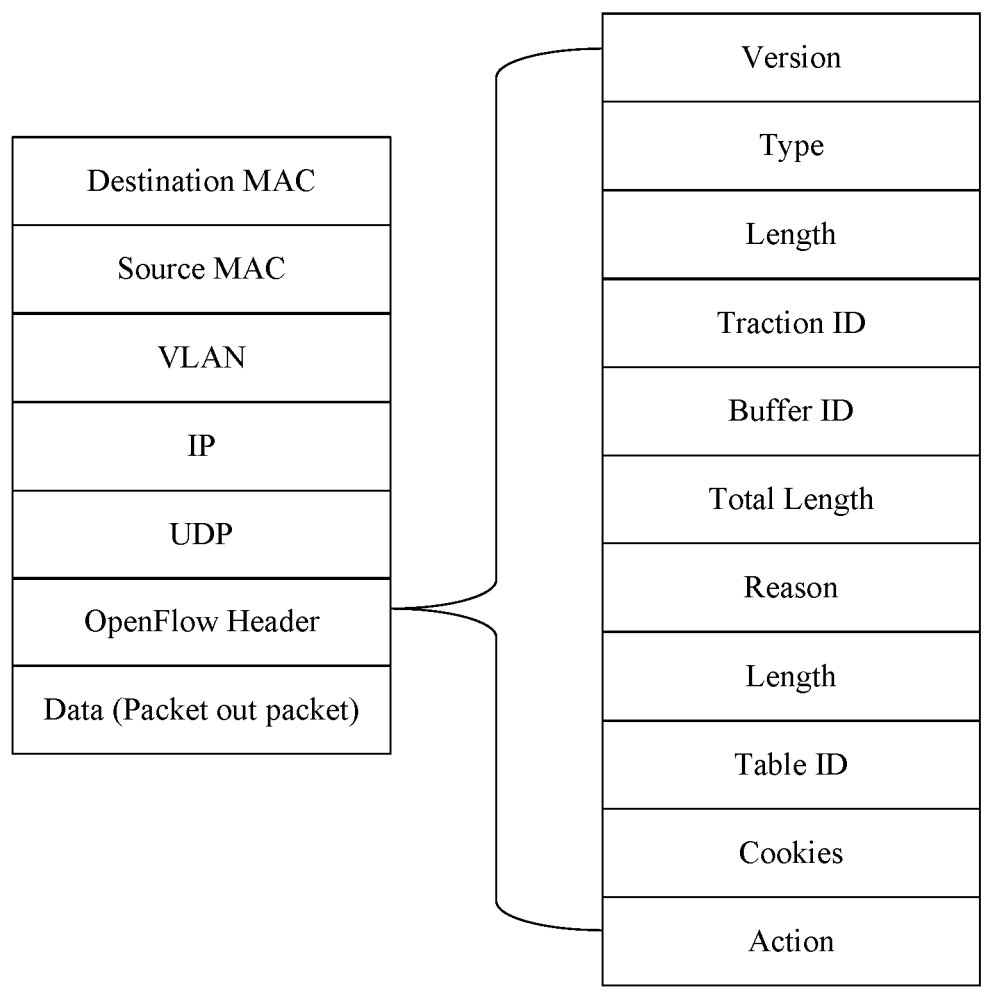
FIG. 6 is a schematic diagram of a frame structure of a packet out packet according to an embodiment of the present invention.

A frame structure of the packet out packet is similar to that of the packet in packet, and differs in that the address information in the packet out packet is address information of the SDN switch, and the packet out packet further carries the control information sent by the SDN controller. For example, the control information carries the port number and/or the flow table number. The fourth packet is forwarded to the corresponding port or flow table according to at least one of a port number or the flow table number. As shown in FIG. 6, a packet out packet in FIG. 6 includes an action field, and the action field may be used to carry control information. Because no packet format change is involved in this embodiment of the present invention, for a meaning of the foregoing field, refer to a definition in the standard. Details are not described herein.

In the foregoing steps 302 to 304, the second packet and the third packet each may be specifically an IGMP (Internet group management protocol) packet, a DHCP (dynamic host configuration protocol) packet, an ERPS (Ethernet ring protection switching) packet, or the like.

The packet in packet is forwarded by an OpenFlow channel agent (OFCA) module of the SDN switch to the SDN controller. The SDN controller sends the packet out packet to the OpenFlow channel agent (OFCA) module, and the OFCA module deletes the control information and the address information in the packet out packet to obtain the fourth packet, and forwards the fourth packet to the corresponding port or flow table according to at least one of a port number or the flow table number that is carried in the control information in the packet out packet.

In this embodiment of the present invention, the channel agent module is disposed on the SDN switch, and a packet that is originally forwarded by the CPU of the SDN switch is forwarded by the channel agent module, thereby reducing a latency of forwarding a packet.

Embodiment 2

Figure 1:
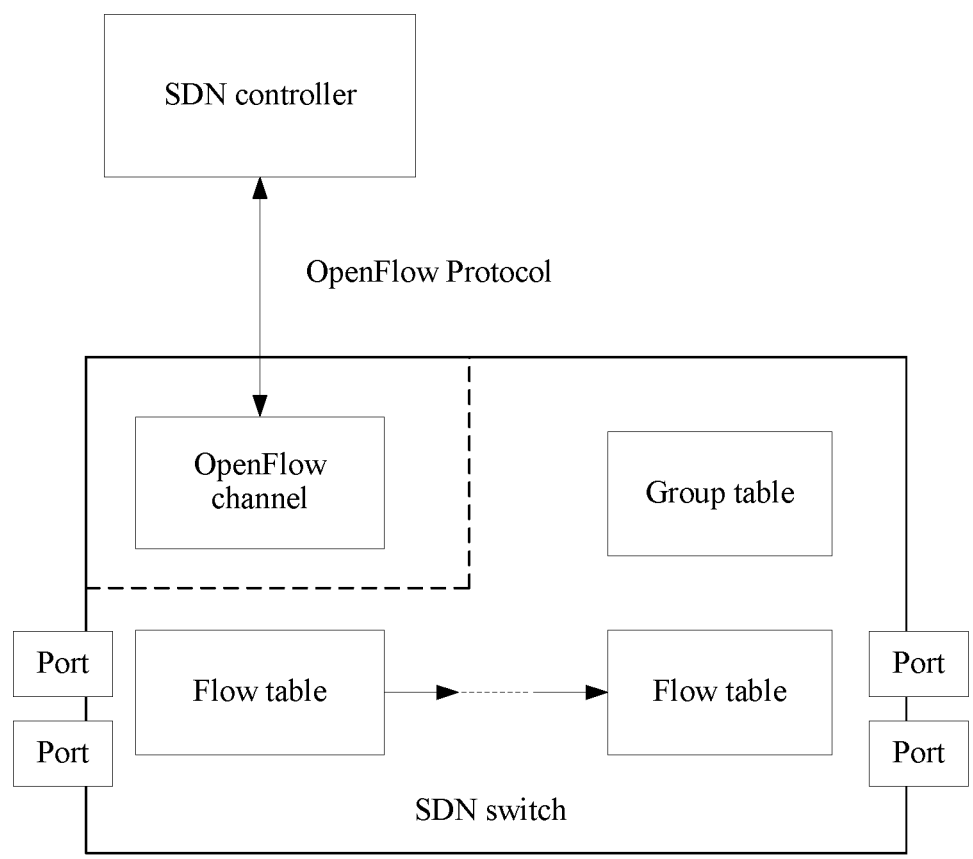
FIG. 1 is a schematic architectural diagram of an existing SDN.
Figure 7:
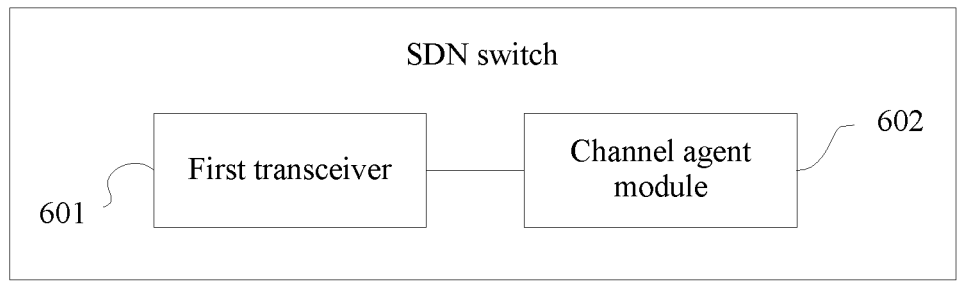
FIG. 7 is a functional block diagram of an SDN switch according to an embodiment of the present invention.

This embodiment of the present invention provides a software defined network. An architecture is shown in FIG. 1. In this embodiment, the software defined network includes an SDN controller and an SDN switch, and the SDN controller and the SDN switch interact through a communication channel. In this embodiment, the SDN switch includes a processor and a data path, and the processor includes an OpenFlow agent. As shown in FIG. 7, the SDN switch further includes:

a first transceiver 601, configured to: receive a first packet, determine that the first packet is to be sent to the SDN controller, and forward the first packet to a channel agent module 602; and the channel agent module 602, configured to: add address information of the SDN controller to the first packet, encapsulate the first packet into a second packet, and send the second packet to the SDN controller by using a secondary OpenFlow channel, where the first transceiver 601 is further configured to: receive a third packet sent by the SDN controller, and forward the third packet to the channel agent module 602; and the channel agent module 602 is further configured to: delete control information and address information in the third packet, convert the third packet into a fourth packet, and send the fourth packet to a corresponding port or flow table according to at least one of a port number or a flow table number that is carried in the control information in the third packet.

In this embodiment of the present invention, the channel agent module is disposed on the SDN switch, and a packet that is originally forwarded by a CPU of the SDN switch to the SDN controller is forwarded by the channel agent module. The original CPU still undertakes original work except for packet forwarding. In other words, in this embodiment of the present invention, the SDN switch has a "dual-core" function, to reduce a latency of forwarding a packet.

Embodiment 3

Figure 8:
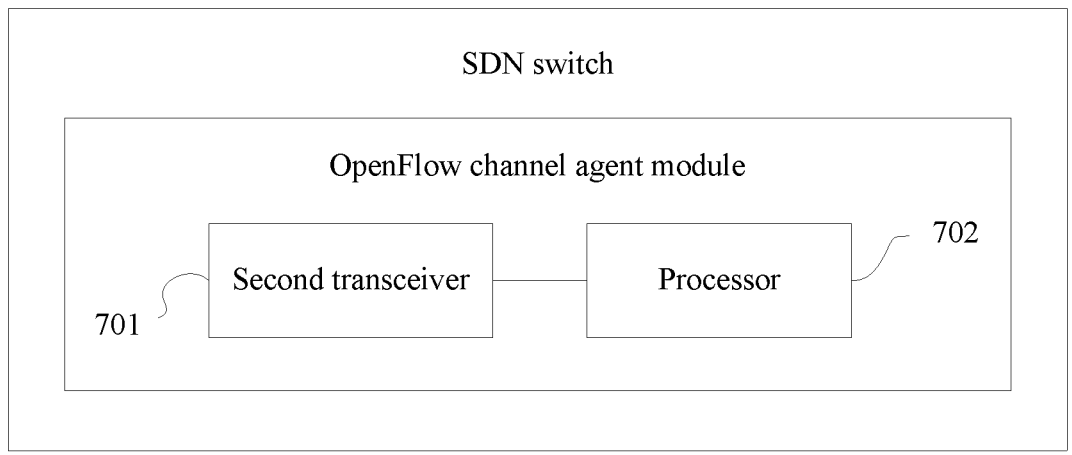
FIG. 8 is a functional block diagram of another SDN switch according to an embodiment of the present invention.

As shown in FIG. 8, this embodiment of the present invention further provides a channel agent module. The channel agent module is located in an SDN switch of a software defined network, and the channel agent module includes a second transceiver 701 and a processor 702.

The second transceiver 701 receives a first packet and sends the first packet to the processor 702. The processor 702 is configured to: add address information of an SDN controller to the first packet, encapsulate the first packet into a second packet, and send the second packet to the second transceiver 701. The second transceiver 701 sends the second packet to the SDN controller. Then the second transceiver 701 receives a third packet sent by the controller, and forwards the third packet to the processor 702 for processing. The processor 702 deletes control information and address information in the third packet, converts the third packet into a fourth packet, and sends the fourth packet to the second transceiver 701. Then the second transceiver 701 sends the fourth packet to a corresponding port or flow table according to at least one of a port number or a flow table number that is carried in the control information in the third packet.

In this embodiment, the channel agent module is implemented by using a network processor (NP), a field programmable gate array (FPGA), or an application-specific integrated circuit (ASIC). The channel agent module is disposed on the SDN switch, and a packet that is originally forwarded by a CPU of the SDN switch to the SDN controller is forwarded by the channel agent module. The original CPU still undertakes original work except for packet forwarding. In other words, in this embodiment of the present invention, the SDN switch has a "dual-core" function, to reduce a latency of forwarding a packet.

Figure 9:
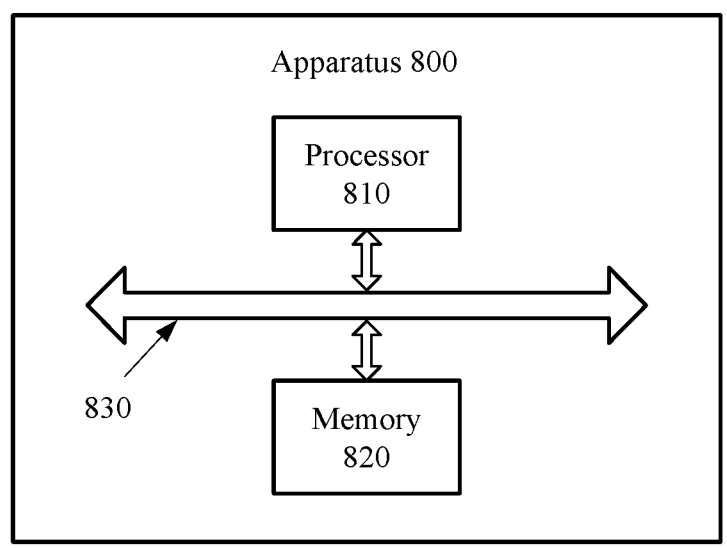
FIG. 9 is a functional block diagram of a data communications apparatus according to an embodiment of the present invention.

As shown in FIG. 9, an embodiment of the present invention further discloses a data communications apparatus. The data communications apparatus includes a processor 810, a memory 820, and a bus system 830. The processor 810 is connected to the memory 820 by using the bus system 830. The memory 820 is configured to store an instruction, and the processor 810 is configured to execute the instruction stored in the memory 820.

The processor 810 is configured to: receive a first packet, determine that the first packet is to be sent to an SDN controller, and forward the first packet to a channel agent module. The channel agent module adds address information of the SDN controller to the first packet, encapsulates the first packet into a second packet, and sends the second packet to the controller. The processor 810 receives a third packet sent by the SDN controller, and forwards the third packet to the channel agent module. The channel agent module deletes control information and address information in the third packet, converts the third packet into a fourth packet, and sends the fourth packet to a corresponding port or flow table according to at least one of a port number or a flow table number that is carried in the control information in the third packet.

For a specific execution procedure of the processor 810, refer to descriptions corresponding to the flowchart of FIG. 3. Details are not described herein again.

A person skilled in the art should understand that the embodiments of the present invention may be provided as a method, a system, or a computer program product. Therefore, the embodiments of the present invention may use a form of hardware only embodiments, software only embodiments, or embodiments with a combination of software and hardware. Moreover, the embodiments of the present invention may use a form of a computer program product that is implemented on one or more computer-usable storage media (including but not limited to a disk memory, an optical memory, and the like) that include computer-usable program code.

This application is described with reference to the flowcharts or block diagrams of the method, the device (system), and the computer program product according to the embodiments of the present invention. It should be understood that computer program instructions may be used to implement each process, each block in the flowcharts, the block diagrams, or a combination of a process, a block in the flowcharts and the block diagrams. These computer program instructions may be provided for a general-purpose computer, a dedicated computer, an embedded processor, or a processor of another programmable data processing device to generate a machine, so that the instructions executed by the computer or the processor of another programmable data processing device generate an apparatus for implementing a specified function in one or more processes in the flowcharts or in one or more blocks in the block diagrams.

These computer program instructions may also be stored in a computer readable memory that can instruct the computer or the another programmable data processing device to work in a specific manner, so that the instructions stored in the computer readable memory generate an artifact that includes an instruction apparatus. The instruction apparatus implements a specified function in one or more processes in the flowcharts or in one or more blocks in the block diagrams.

These computer program instructions may also be loaded onto the computer or the another programmable data processing device, so that a series of operations and steps are performed on the computer or the another programmable device, thereby generating computer-implemented processing. Therefore, the instructions executed on the computer or the another programmable device provide steps for implementing a specified function in one or more processes in the flowcharts or in one or more blocks in the block diagrams.

Apparently, a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:
1. A software defined network, wherein the software defined network (SDN) comprises an SDN controller and an SDN switch, the SDN switch comprising a processor, a data path and a channel agent, and the SDN switch further comprises:

a first transceiver, configured to: receive a first packet, determine that the first packet is to be sent to the SDN controller, and forward the first packet to the channel agent; and the channel agent, configured to: add address information of the SDN controller to the first packet, encapsulate the first packet into a second packet, and send the second packet to the SDN controller, wherein the first transceiver is further configured to: receive control information and address information in a third packet sent by the SDN controller, and forward the third packet to the channel agent, wherein the control information and the address information in the third packet comprise an IP address of the SDN switch, an IP address of the SDN controller, and an OpenFlow version number, and the channel agent is further configured to: delete the control information and the address information in the third packet, convert the third packet into a fourth packet, and send the fourth packet to a corresponding port or flow table according to at least one of a port number or a flow table number that is carried in the control information in the third packet.

2. The software defined network according to claim 1, wherein the second packet and the third packet each are one of a dynamic host configuration protocol (DHCP) packet, an Internet group management protocol (IGMP) packet, or an Ethernet ring protection switching (ERPS) packet.

3. The software defined network according to claim 1, wherein the first transceiver is further configured to receive an encryption/decryption algorithm mode delivered by the SDN controller for data transmission between the SDN controller and the SDN switch.

4. The software defined network according to claim 3, wherein the channel agent is further configured to encrypt and decrypt the second packet and the third packet by using the encryption/decryption algorithm mode.

5. The software defined network according to claim 1, wherein the channel agent is one of a network processor (NP), a field programmable gate array (FPGA), or an application-specific integrated circuit (ASIC).

6. A method for forwarding a packet by a software defined network (SDN), comprising:
receiving a first packet, determining that the first packet is to be sent to an SDN controller, and forwarding the first packet to a channel agent;
adding, by the channel agent, address information of the SDN controller to the first packet, encapsulating the first packet into a second packet, and sending the second packet to the SDN controller; and
receiving control information and address information in a third packet sent by the SDN controller, and forwarding the third packet to the channel agent, wherein the control information and the address information in the third packet comprise an IP address of an SDN switch, an IP address of the SDN controller and an OpenFlow version number; and
deleting, by the channel agent, the control information and the address information in the third packet, converting the third packet into a fourth packet, and sending the fourth packet to a corresponding port or flow table according to at least one of a port number or a flow table number that is carried in the control information in the third packet.

7. The method according to claim 6, wherein the second packet and the third packet each are one of a dynamic host configuration protocol (DHCP) packet, an Internet group management protocol (IGMP) packet, and an Ethernet ring protection switching (ERPS) packet.

8. The method according to claim 6, farther comprising:
receiving an encryption/decryption algorithm mode delivered by the SDN controller for data transmission between the SDN controller and the SDN switch.

9. The method according to claim 8, further comprising:
encrypting and decrypting the second packet and the third packet by using the encryption/decryption algorithm mode.

10. The method according to claim 6, wherein the channel agent is one of a network processor (NP), a field programmable gate array (FPGA), or an application-specific integrated circuit (ASIC).

* * * * *

UNITED STATES PATENT AND TRADEMARK OFFICE
CERTIFICATE OF CORRECTION

PATENT NO. : 10,951,520 B2
APPLICATION NO. : 16/571115
DATED : March 16, 2021
INVENTOR(S) : Wenjing Wu et al.

Page 1 of 1

It is certified that error appears in the above-identified patent and that said Letters Patent is hereby corrected as shown below:

In the Claims

Column 10, Line 29, Claim 8, please delete "farther" and insert --further-- between "6," and "comprising".

Signed and Sealed this
Eighth Day of June, 2021

Drew Hirshfeld
*Performing the Functions and Duties of the*
*Under Secretary of Commerce for Intellectual Property and*
*Director of the United States Patent and Trademark Office*